United States Patent
Hammel et al.

(10) Patent No.: US 9,154,073 B2
(45) Date of Patent: Oct. 6, 2015

(54) METHOD FOR DETERMINING THE ROTOR POSITION OF A SYNCHRONOUS MACHINE OPERATED IN FIELD-ORIENTED MANNER

(75) Inventors: Wolfgang Hammel, Bruchsal (DE); Matthias Hartmann, Bruchsal (DE); Harald Wolf, Ubstadt-Weiher (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 619 days.

(21) Appl. No.: 13/394,081

(22) PCT Filed: Aug. 24, 2010

(86) PCT No.: PCT/EP2010/005166
§ 371 (c)(1),
(2), (4) Date: Mar. 2, 2012

(87) PCT Pub. No.: WO2011/026578
PCT Pub. Date: Mar. 10, 2011

(65) Prior Publication Data
US 2012/0153883 A1 Jun. 21, 2012

(30) Foreign Application Priority Data
Sep. 2, 2009 (DE) .................. 10 2009 039 672

(51) Int. Cl.
*H02P 1/46* (2006.01)
*H02P 21/00* (2006.01)
(Continued)

(52) U.S. Cl.
CPC .......... *H02P 25/023* (2013.01); *H02P 21/0039* (2013.01); *H02P 21/146* (2013.01); *H02P 2207/05* (2013.01)

(58) Field of Classification Search
USPC .................. 318/700, 715, 721, 735, 823
See application file for complete search history.

(56) References Cited

U.S. PATENT DOCUMENTS 4,388,577 A * 6/1983 Blaschke et al. .............. 318/717
4,764,712 A * 8/1988 Blaschke et al. .............. 318/778
(Continued)

FOREIGN PATENT DOCUMENTS

DE    102 26 974         1/2004
DE    10226974 A1 *      1/2004
(Continued)

OTHER PUBLICATIONS

International Search Report, issued in corresponding International Application No. PCT/EP2010/005166.
(Continued)

*Primary Examiner* — Eduardo Colon Santana
*Assistant Examiner* — Iftekhar Mustafa
(74) *Attorney, Agent, or Firm* — Kenyon & Kenyon LLP

(57) ABSTRACT

A method for determining the rotor position of a synchronous machine operated in field-oriented manner, which has an effective inductivity that is dependent on the rotor position, the motor current being acquired, and the motor voltage being set with the aid of a pulse-width-modulation method,
a signal which is in synchrony with the pulse-width-modulation frequency being superimposed on the motor voltage value to be set,
values of the motor current being acquired in synchrony with the pulse-width modulation frequency,
a current component induced by the superimposed voltage signal
and a residual current component, i.e., fundamental wave component, being determined,
the current component induced by the superimposed voltage signal being used for determining an estimated rotor angle position, whose phase error in relation to the actual rotor angle position is reduced by means of a flux model,
the residual current component being supplied to a current controller.

15 Claims, 3 Drawing Sheets

(51) Int. Cl.
*H02P 25/02* (2006.01)
*H02P 21/14* (2006.01)

(56) References Cited

U.S. PATENT DOCUMENTS

| | | | |
|---|---|---|---|
| 4,884,023 A * | 11/1989 | Schmidt et al. | 324/765.01 |
| 6,137,258 A * | 10/2000 | Jansen | 318/802 |
| 6,924,617 B2 | 8/2005 | Schulz et al. | |
| 6,940,253 B2 * | 9/2005 | Hinkkanen | 318/804 |
| 7,098,623 B2 * | 8/2006 | Piippo | 318/721 |
| 8,008,878 B2 | 8/2011 | Götz et al. | |
| 8,330,403 B2 * | 12/2012 | Basic et al. | 318/400.02 |
| 2005/0001583 A1* | 1/2005 | Hinkkanen | 318/807 |
| 2006/0091847 A1* | 5/2006 | Piippo | 318/721 |
| 2008/0129243 A1* | 6/2008 | Nashiki | 318/701 |
| 2008/0174260 A1 | 7/2008 | D'Angelo et al. | |
| 2011/0068722 A1 | 3/2011 | Wolf et al. | |
| 2013/0221885 A1* | 8/2013 | Hunter | 318/400.15 |

FOREIGN PATENT DOCUMENTS

| | | |
|---|---|---|
| DE | 11 2004 001 141 | 5/2004 |
| DE | 10 2008 025 408 | 12/2009 |
| EP | 1 653 601 | 5/2006 |
| EP | 2 023 479 | 2/2009 |

OTHER PUBLICATIONS

Frenzke et al., *"Position-sensorless control of direct drive permanent magnet synchronous motors for railway traction,"* 35th Annual IEEE Power Electronics Specialists Conference, p. 1372-1377, Germany, 2004.

International Preliminary Report on Patentability and Written Opinion, issued in corresponding International Application No. PCT/EP2010/005166.

* cited by examiner

METHOD FOR DETERMINING THE ROTOR POSITION OF A SYNCHRONOUS MACHINE OPERATED IN FIELD-ORIENTED MANNER

FIELD OF THE INVENTION

The present invention relates to a method for determining the rotor position of a synchronous motor operated in field-oriented manner.

BACKGROUND INFORMATION

German Published Patent Application No. 102 26 974 describes a method for determining the rotor position of a synchronous machine operated in field-oriented manner. Here, a sensorless position detection is implemented in that a high-frequency signal is additionally superimposed on the pulse-width-modulated output voltage of the inverter, and the high-frequency component in the associated current signal is separated from the fundamental wave component. The high-frequency component is used for determining the position angle of the rotor. The fundamental wave component is forwarded to a current controller, as actual value.

As an alternative, the high-frequency components would also be separable with the aid of a bandpass filter.

German Published Patent Application No. 10 2008 025 408 describes a method for regulating a synchronous machine, in which a rotor flux vector which is perpendicular to the induced voltage is formed and used as feedback quantity, which, when vanishing drift is present, vanishes as well.

SUMMARY

Example embodiments of the present invention provide for improving the rotor position determination and improving the control method for synchronous machines.

Among features of example embodiments of the present invention in the method for determining the rotor position of a synchronous machine operated in field-oriented manner are that an effective inductivity is provided, which is dependent on the rotor position, the motor current is acquired, and the motor voltage is set with the aid of a pulse-width-modulation method, a signal which is synchronous with the pulse-width-modulation frequency is superimposed on the motor voltage value to be set, values of the motor current are acquired in synchrony with the pulse-width modulation frequency, a current component induced by the superimposed voltage signal, and a residual current component, i.e., the fundamental wave component, are determined, the current component induced by the superimposed voltage signal is used to determine an estimated rotor angle position, whose phase error in relation to the actual rotor angle position is reduced by means of a flux model, the residual current component is supplied to a current controller.

This has the advantage that a synchronous machine is operable without a sensor, employing an improved control method. In particular, a current value extrapolated for a future instant, which may be used as input value for a control structure, is able to be determined from the acquired measured current values, so that the actuating variables determined for the next time interval are able to be determined from this extrapolated current value and take effect at this instant simultaneously. This improves the control method for the synchronous machine. Reduced effective dead time, in particular, comes about in the closed current control circuit, which makes it possible to enhance the control response, especially the achievable bandwidth.

In example embodiments, a number of measured motor current values are used for determining parameters provided in a first parameter-based function assigned to the fundamental wave component, and in a second parameter-based function assigned to the current component induced by the superimposed voltage signal, the sum of the parameter-based functions in particular being adapted to the acquired current values and/or being adapted as fit functions. This offers the advantage that a parameter-based function is used for fitting, i.e., adapting, the fundamental wave component, which function has at least one non-linear component. This also improves the determination of the superimposed higher-frequency signal to be separated, since deviations in adapting the fundamental wave component lead to falsifications in the determination of the amplitude of the current component induced by the superimposed voltage signal, and the fundamental wave current component is able to be determined very precisely.

In example embodiments, the first parameter-based function is a polynomial of the nth order, the number being greater than n by one, in particular. This has the advantage that the polynomial is able to be determined precisely.

In example embodiments, the second parameter-based function is a triangular signal and/or a function composed of linear segments, its amplitude being a parameter, in particular, and its frequency being in synchrony with the pulse-width modulation frequency. This has the advantage that the high-frequency component is mathematically representable in excellent approximation and may be described by only one parameter.

In example embodiments, the number is four, or greater than four. This has the advantage that a few current measurements already suffice to execute the present invention.

In example embodiments, once the parameters of the parameter-based functions have been determined, a current value is extrapolated for an instant at which the values of the actuating variable, especially the output voltage, are made to take effect, so that a synchronous current value is used as input value for the control structure when determining the values of the actuating variable. In this context it is advantageous that an extrapolation of the fundamental wave component is able to be performed, and the value entered in the control structure is thus assigned to the same instant as the values of the actuating variable.

In example embodiments, the amplitude of the current component induced by the superimposed voltage signal is determined from a linear combination of at least three of the detected current measured values. This has the advantage that the amplitude is able to be determined in a very simple manner.

In example embodiments, an extrapolated current value for an instant at which a value of the actuating variable, especially the output value, is made to take effect is determined by linear combination of at least three of the acquired measured current values. This has the advantage that a very simple and rapid extrapolation is able to take place.

In example embodiments, a model value for the angular position is determined from the measured electrical quantities of motor voltage and motor current, the synchronous machine in particular not being equipped with a sensor for the angular position. This has the advantage of allowing a sensorless control for a synchronous machine.

In example embodiments, the effective inductivity has different values at different angular positions of the rotor. This, in particular, allows the rotor angle position to be detected even at very low rotational speeds and at standstill.

In example embodiments, the period length of the superimposed signal amounts to n-times the pulse-width-modulation time, n being an integral number that is greater than two. This has the advantage that the fundamental wave component is able to be separated from the high-frequency component, especially at an excellent signal-noise ratio.

In example embodiments, the value of the motor voltage to be set is determined following a specific time period Ttrl, the time period in particular amounting to four times the pulse-width-modulation period, or to a higher integral multiple thereof. It is advantageous that a measured current value is able to be determined in synchrony with the pulse-width modulation period, and that, following the determination of four measured current values, the fundamental wave component and the higher-frequency component are able to be separated, the adaptation functions providing an excellent approximation of the determined current characteristic.

In example embodiments the motor current is acquired synchronously with the instants of the greatest change in the signal voltage. This offers the advantage that a local extreme value is acquired as measured current value in every instance. In this way the amplitude of the higher-frequency current component is able to be determined very precisely.

In example embodiments, the current component induced by the superimposed voltage signal, i.e., the higher-frequency current component, is subtracted from the acquired current, and the motor current determined in this manner is supplied, as actual value, to the field-oriented control. This has the advantage of separating the superimpositioning, so that the fundamental wave component that affects the control response of the machine is utilized for the control. The higher-frequency current component is used for determining the angular position of the rotor.

In example embodiments, an estimated flux vector is produced, whose direction corresponds to the estimated rotor angle position, this estimated flux vector being supplied to the flux model as support, the flux model also being supplied with the individual value of the set output voltage and the acquired motor current. The estimated flux vector is able to be regulated toward the flux vector determined from the output voltage and the motor current. This has the advantage that the high dynamic response of the flux model is able to be utilized also at very low rotational speeds.

In example embodiments, a rotor flux vector is determined in the flux model, and its difference in relation to the estimated rotor flux vector is forwarded to a PI element, the output signal of the PI element being used to reduce drift of an integration element of the flux model. This has the advantage of allowing a sensorless control, in which drift of the integration element is able to be counteracted in such a way that the estimated flux vector is regulated in the direction of the physical flux vector, so that, due to the support of the flux model, no phase shift of the model flux vector arises in relation to the actual flux vector.

In example embodiments, below a first rotational speed, the flux model is supported by the rotor flux vector which is based on the estimated rotor position angle, the amount, in particular, being specifiable, and the direction being estimated from the current component induced by the superimposed voltage signal. This has the advantage that the flux model may even be used at very low rotational speeds and at standstill.

In example embodiments, above a second rotational speed, the flux model is supported by a rotor flux vector whose amount is specifiable and whose direction is perpendicular to the direction of the induced voltage vector formed on the input side of the flux model. This has the advantage that a high induced voltage is generated above the second rotational speed, so that an excellent position detection of the rotor angle is possible. Furthermore, the superimposed high-frequency voltage is able to be switched off in the upper rotational speed range, which allows complete utilization of the maximum rectifier output voltage.

Between the first and the second rotational speeds, in example embodiments, the flux model is supported by a rotor flux vector which is formed as the sum from a first component of the rotor flux vector, based on the estimated rotor position angle, and from another component of the rotor flux vector whose amount is specifiable and whose direction is perpendicular to the direction of the induced voltage vector formed on the input side of the flux model, the ratio of the components being a function of the frequency. This has the advantage that in this transitional rotational speed range, i.e., between the first and second rotational speeds, a continual change between the feedback variables takes place, so that fluctuations in the control response are avoided.

The first rotational speed, in particular, is smaller than the second rotational speed.

Example embodiments of the present invention are explained in greater detail with reference to the appended Figures.

DETAILED DESCRIPTION

According to example embodiments of the present invention, an electric motor, in particular a synchronous motor, is supplied by an inverter, which includes a control circuit in its signal electronics. The synchronous motor has a rotor fitted with permanent magnets. As an alternative, however, it is also possible to use a rotor having a field-excitation winding, in which case the excitation winding will be inductively coupled or must be supplied with a unipolar current with the aid of brushes.

This control circuit, which therefore operates without sensor, i.e., without an angle sensor, is supplied with the motor current as actual value.

The control circuit sets the motor voltage as output quantity by outputting a particular pulse-width modulation ratio, which, when averaged across pulse-width-modulation period TPWM, results in the value to be set. In each time interval Tctrl, the control circuit calculates new values for the actuating variables and thereby determines a particular next output voltage value, i.e., a particular next value for the motor voltage. This time period Tctrl amounts to four pulse-width-modulation periods $T_{PWM}$ in the exemplary embodiment shown.

To detect the angular position of the rotor, a high-frequency carrier signal is superimposed on the output variable of the control circuit. In the following text, the output variable is also referred to as fundamental wave, on which the carrier signal is superimposed.

The carrier signal is superimposed on the fundamental wave signal determined by the control, i.e., the motor voltage vector, in an estimated direction of the rotor. In this context, the motor voltage vector is representable as a vector which is rotatable in a two-dimensional plane. The amplitude of the carrier signal is representable in scalar manner, and the direction corresponds to the estimated direction of the rotor. The voltage vector to be supplied by the inverter on the output side for the supply of the synchronous motor thus constitutes superimpositioning of the vector of the fundamental wave and the carrier signal.

Figure 1:
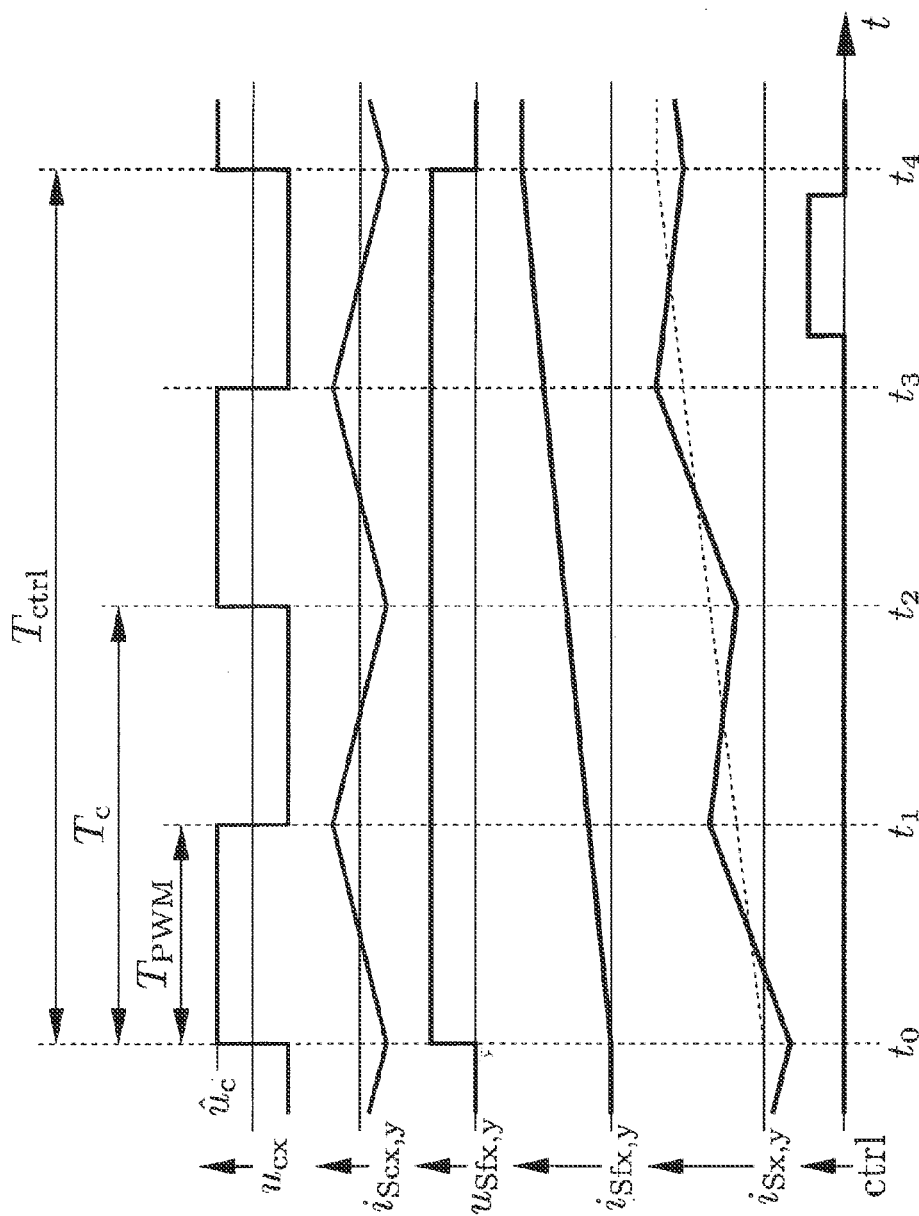
FIG. 1 illustrates idealized current and voltage characteristics by way of example.

FIG. 1 illustrates idealized current and voltage characteristics by way of example.

An exemplary setpoint voltage characteristic uSfx,y is shown at the input terminals of the electric motor, in particular as manipulated variable of the current controller, and the superimposed high-frequency carrier signal has been omitted. Voltage characteristic ucx of the high-frequency carrier signal has a period length Tc which exemplarily corresponds to twice the length of pulse-width modulation period TPWM.

Because of the motor inductivity, the current characteristics associated with the voltage characteristics, i.e., current characteristic iScx,y of the high-frequency carrier signal, and current characteristic iSfx,y resulting from voltage characteristic uSfx,y, come about in a stator winding of the electric motor. Resulting total current characteristic iSx,y in the stator winding of the electric motor is shown as well.

According to example embodiments of the present invention, the motor current, i.e., the motor current vector, is acquired at the instants shown in FIG. 1, that is to say, at sampling instant t0, sampling instant t1, sampling instant t2, and sampling instant t3 of the current acquisition.

The sampling instants are synchronous with the pulse-width modulation signal. In addition, the sampling instants are also set in synchrony with the particular instants at which the rectangular carrier signal exhibits its jump positions. At these instants, the voltage characteristic of the carrier signal thus exhibits the greatest changes in voltage. In this manner the particular maxima and minima of the current characteristic thus lie at the sampling instants, so that the current is acquired at these extreme values in each case.

Using synchronous sampling, it is possible to determine the mentioned local maxima and minima of the current characteristic induced by the voltage characteristic of the carrier signal. In so doing, a linear current characteristic is assumed within a pulse-width modulation period, which constitutes an excellent approximation at a pulse-width modulation frequency of several kHz, such as approximately 4 kHz, 8 kHz, or even 16 kHz.

In contrast to using a bandpass filter for separating the high-frequency carrier signal, no phase shift is therefore induced. This is so because the synchronous sampling according to the present invention allows a direct determination of the high-frequency current characteristic.

For the separation of the high-frequency carrier signal component from the fundamental wave component, it is assumed that the fundamental wave is a polynomial of the second order as a function of time, this polynomial being defined by three parameters; it is also assumed that the carrier signal is composed of linear function segments, the carrier signal being in synchrony with the pulse-width modulation frequency. The amplitude of the carrier signal and also the three parameters of the polynomial are therefore able to be determined via the four acquired current values.

On the one hand, this provides an excellent approximation of the carrier signal characteristic and the fundamental wave characteristic and, on the other hand, an extrapolation of the current value to be expected at instant t4 is implemented. Instant t4 once again is evenly spaced apart, similar to sampling instants t0, t1, t2, t3. The instants thus have the same time interval in relation to the preceding instant.

As mentioned earlier already, the values of the actuating variables, especially the motor voltage, are determined anew in each time interval Tctrl. The required computational steps are performed between instants t3 and t4. The input variable for the determination is the current value of the fundamental wave component extrapolated for instant t4. In this way, the actually existing current value at this instant is known very precisely, and an actual current value, without dead time, is utilized for determining the values of the actuating variables.

The high-frequency component is used to determine the rotor angle. Since it is not routed through a bandpass filter or similar means, it is not affected by phase shift and allows a highly precise determination of the rotor angle position. In particular, the high-frequency current component demodulated in this manner is not falsified even in the presence of dynamic changes of the fundamental wave component. This applies also when the employed motor exhibits significant saturation behavior, as a result of which the current rises of the fundamental wave take place in non-linear manner.

Figure 2:
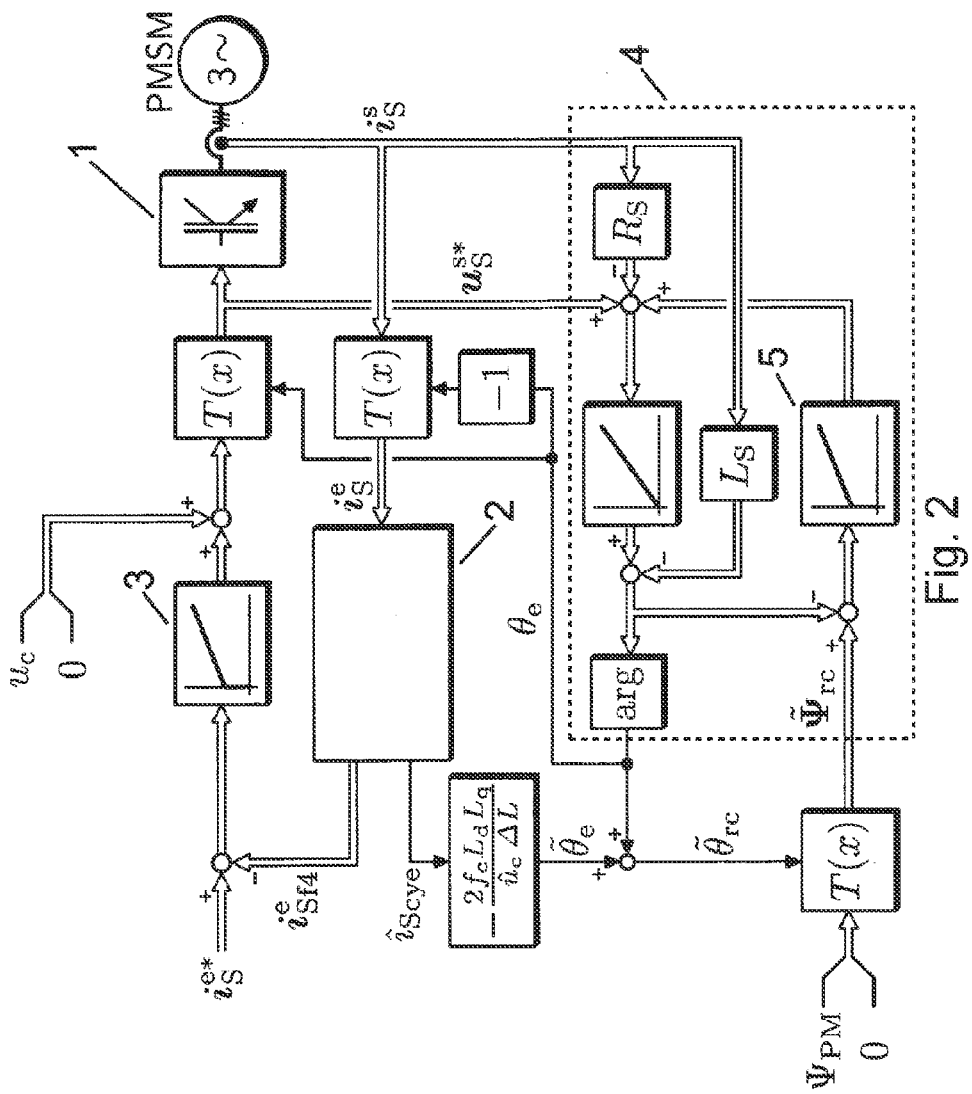
FIG. 2 shows the part of the control structure used for low rotational speeds of the rotor for one exemplary embodiment.

FIG. 2 shows the part of the control structure used for low rotational speeds of the rotor for one exemplary embodiment. Here, the supply voltage of the three-phase motor is supplied by means of output stage 1. The acquired motor current, i.e., stator current vector $i_S$, is represented by the coordinate transformation T(x) in a coordinate system, which is rotated in relation to the stationary coordinate system by means of the estimated rotor position angle. The stator current vector is then forwarded to a decoupling module, which, as previously described, filters the high-frequency signal component from the acquired measured current values and determines an extrapolated current value $i_{Sfa}$ for the fundamental wave component, which is forwarded to the current controller, which includes PI element 3. Carrier signal voltage $U_C$ is superimposed to the output signal of PI element 3, and the result is supplied, as actuating variable, to output stage 1 operated in pulse-width-modulated manner.

The high-frequency signal component filtered out is $\tilde{\theta}_e$ transformed into a phase error, from which a reference angle for rotor position $\theta_e$ is determined using estimated rotor position $\tilde{\theta}_{rc}$ angle. The model value for the rotor position thus determined is used as direction for an estimated rotor flux vector, which is forwarded to a flux model 4. The system deviation of the rotor flux vector is supplied to a PI element 5.

In the process, set voltage vector uS is reduced by the Ohmic voltage drop RS×iS and then added, i.e., integrated, to the value of the estimated stator flux vector. From this, a flux component corresponding to the stator current is deduced, so that an estimated value for the rotor flux vector is determined in this manner.

The argument of the estimated rotor flux vector is used for determining the reference angle for the rotor position $\tilde{\theta}_{rc}$, together with ascertained phase error $\tilde{\theta}_e$.

The exemplary embodiment of FIG. 2 is advantageously able to be used for low rotational speeds of the rotor.

Figure 3:
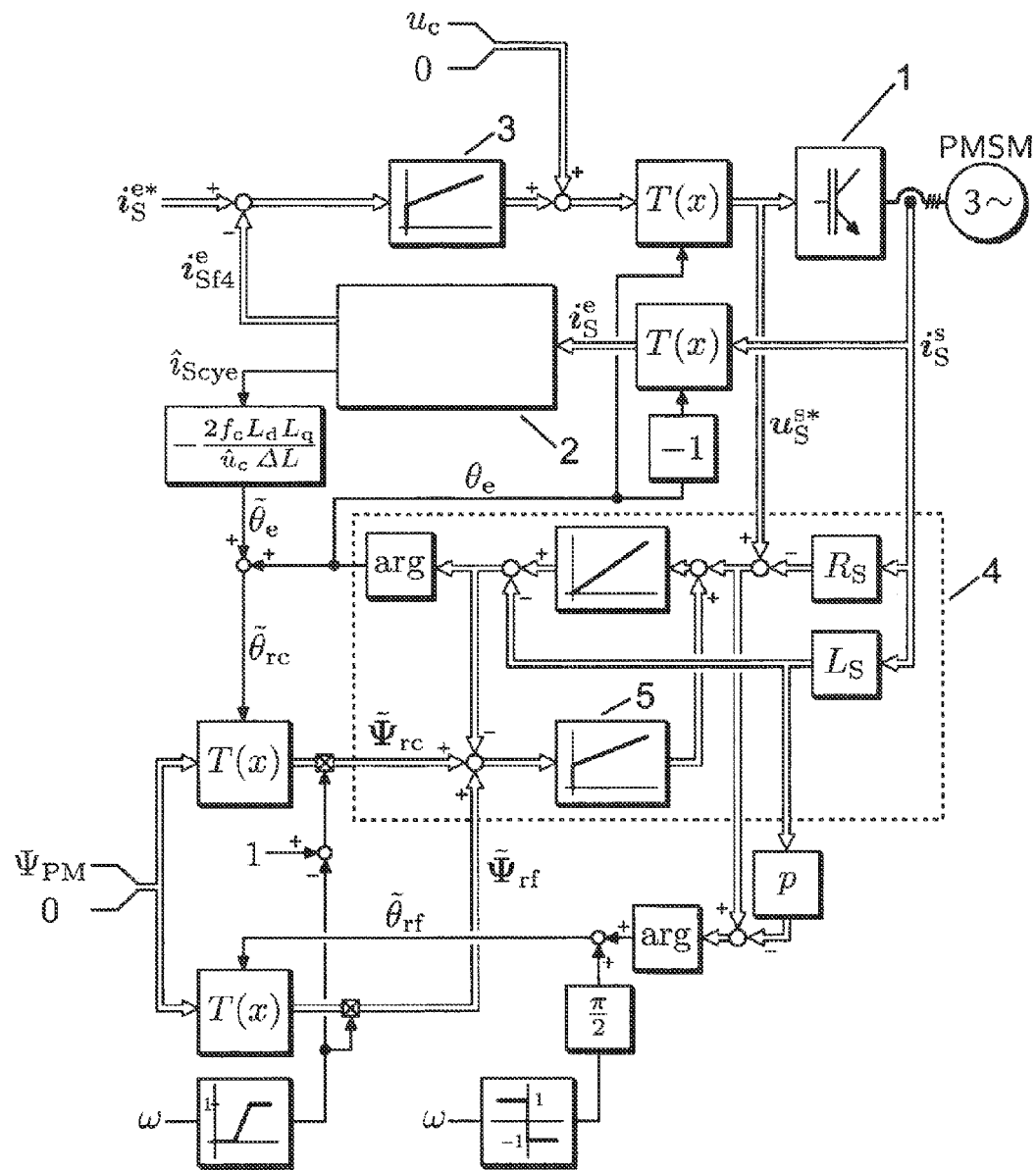
FIG. 3 shows another exemplary embodiment, which is advantageously able to be used for high and low frequencies.

FIG. 3 shows another exemplary embodiment, which is advantageously able to be used for high and low frequencies.

In the process, the flux model for low rotational speeds is based on a reference flux vector, whose direction was determined from the high-frequency demodulated carrier current, as described in connection with FIG. 2.

A rotor flux vector is likewise used as support of the flux model at very high rotational speeds, its angular position, however, being determined without use of the high-frequency carrier current. This angle is determined in such a way that it is directed perpendicular to the direction of the induced voltage vector, which is determined on the input side in the flux model. As a result, the feedback variable is implemented such that, in the presence of vanishing drift of the integration result of the integrating element in the flux model, the feedback variable vanishes as well.

At frequencies in a specifiable transitional frequency range, which lies between the mentioned high and low rotational speeds, a mixture, in particular linear superimpositioning as a function of the frequency, of the two rotor flux vectors is determined and then used as support of the flux model.

Additional details and features of example embodiments of the present invention are shown in the figures.

LIST OF REFERENCE CHARACTERS

1 output stage
2 decoupling module
3 PI element
4 flux model
5 PI element $U_{cx}$ voltage characteristic of the high-frequency carrier signal $i_{Scx,y}$ current characteristic of the high-frequency carrier signal $u_{Sfx,y}$ current characteristic of the fundamental wave component of the motor voltage, in particular as manipulated variable of the current controller $i_{Sfx,y}$ current characteristic resulting from $U_{Sfx,y}$ in a stator winding of the electric motor $i_{Sx,y}$ resulting total current characteristic in a stator winding of the electric motor $T_{ctrl}$ period duration of the current controller
$T_c$ period duration of the high-frequency carrier signal
$T_{PWM}$ length of the pulse-width modulation period
$t_0$ sampling instant of the current acquisition
$t_1$ sampling instant of the current acquisition
$t_2$ sampling instant of the current acquisition
$t_3$ sampling instant of the current acquisition
$t_4$ prediction instant for the current PMSM synchronous motor having permanent magnets disposed on its rotor

What is claimed is:

1. A method for determining a rotor position of a synchronous machine operated in field-oriented manner, which has an effective inductivity that is dependent on the rotor position, comprising:
   acquiring a motor current;
   setting a motor voltage in accordance with a pulse-width-modulation method;
   superimposing a signal which is synchronous with a pulse-width-modulation frequency on the motor voltage value to be set;
   acquiring values of the motor current in synchrony with the pulse-width modulation frequency;
   determining a current component induced by the superimposed voltage signal and at least one of (a) a residual current component and (b) a fundamental wave component;
   using the current component induced by the superimposed voltage signal to determine an estimated rotor angle position, whose phase error in relation to an actual rotor angle position is reduced by a flux model; and
   supplying the residual current component to a current controller.

2. The method according to claim 1, wherein a number of measured motor current values are used for determining parameters provided in a first parameter-based function assigned to the fundamental wave component, and in a second parameter-based function assigned to the current component induced by the superimposed voltage signal, a sum of parameter-based functions at least one of (a) being adapted to the acquired current values and (b) being adapted as fitting functions.

3. The method according to claim 2, wherein at least one of (a) the first parameter-based function is a polynomial of the n-th order, a number of measured motor current values being greater than n by one, and (b) the second parameter-based function is at least one of (i) a triangular signal and (ii) a function composed of linear segments, its amplitude being a parameter and its frequency being synchronous with the pulse-width modulation frequency.

4. The method according to claim 3, wherein the number is four or greater than four.

5. The method according to claim 2, wherein following the determination of the parameters of the parameter-based functions, a current value is extrapolated for an instant at which the values of at least one of (a) an actuating variable and (b) an output voltage are made to take effect, so that a synchronous current value is used for determining the values of the actuating variable.

6. The method according to claim 5, wherein an extrapolated current value for an instant at which a value of at least one of (a) the actuating variable and (b) an output voltage is made to take effect is determined by a linear combination of at least three of the acquired measured current values.

7. The method according to claim 1, wherein an amplitude of the current component induced by the superimposed voltage signal is determined from a linear combination of at least three of the acquired measured current values.

8. The method according to claim 1, wherein a model value for the angular position is determined from measured electrical quantities of motor voltage and motor current, the synchronous machine not being equipped with an angular position sensor.

9. The method according to claim 1, wherein at least one of (a) an effective inductivity has different values at different rotor angle positions and (b) a period length of the superimposed signal amounts to n times the pulse-width modulation period, n being an integral number that is greater than one.

10. The method according to claim 1, wherein at least one of (a) the motor voltage value to be set is determined following an individual time period amounting to four times the pulse-width-modulation period or to a higher integral multiple thereof and (b) the motor current is acquired synchronously with instants of greatest change in the signal voltage.

11. The method according to claim 1, wherein the current component induced by the superimposed voltage signal is subtracted from the acquired current, and the motor current determined in this manner is forwarded, as an actual value, to a field-oriented control.

12. The method according to claim 1, wherein an estimated flux vector is produced, whose direction corresponds to the estimated rotor angle position, and the estimated flux vector is supplied to the flux model as support, the flux model also being supplied with an individual value of the set output voltage and the acquired motor current.

13. The method according to claim 12, wherein a rotor flux vector is determined in the flux model, whose difference in relation to the estimated rotor flux vector is forwarded to a PI element, an output signal of the PI element being used to reduce drift of an integration element of the flux model.

14. The method according to claim 1, wherein at least one of (a) below a first rotational speed, the flux model is supported by the rotor flux vector based on the estimated rotor position angle, the amount being specifiable, and a direction being estimated from the current component induced by the superimposed voltage signal, (b) above a second rotational speed, the flux model is supported by a rotor flux vector whose amount is specifiable and whose direction is perpendicular to the direction of the induced voltage vector formed on the input side of the flux model, (c) between the first and the second rotational speeds, the flux model is supported by a rotor flux vector formed as the sum from a first component of the rotor flux vector based on the estimated rotor position angle, and from another component of the particular rotor flux vector whose amount is specifiable and whose direction is perpendicular to the direction of the induced voltage vector formed on the input side of the flux model, the ratio of the components being a function of the frequency.

15. The method according to claim 14, wherein the first rotational speed is smaller than the second rotational speed.

* * * * *